United States Patent Office 3,576,794
Patented Apr. 27, 1971

3,576,794
WAX FROM ETHYLENE AND PROCESS FOR PRODUCTION THEREOF
Toshiyuki Tani, Takaoka-shi, Tomio Ishiwata, Tokyo-to, and Tomoo Yamamoto, Takada-shi, Japan, assignors to Nippon Soda Kabushiki Kaisha, Tokyo-to, Japan
Filed Dec. 6, 1965, Ser. No. 511,757
Int. Cl. C08f 1/60
U.S. Cl. 260—94.9
6 Claims

ABSTRACT OF THE DISCLOSURE

A wax which is polymerized ethylene and chlorohydrocarbon. The wax is produced by heating ethylene and chlorohydrocarbon in a pressure vessel in the presence of a radical forming catalyst.

---

This invention relates to a novel and improved wax made from ethylene and chlorohydrocarbon as co-reactant, the wax has an average molecular weight in the range of 300 to 10,000 and is useful as a coating material for water proofing imparting of moisture resistance, improvement of mechanical strength and as an aesthetic coating, a parting or releasing agent for casting molds, a vehicle of pigment, and an improving agent for various kinds of wax and emulsions. The invention also relates to a process for the preparation of the new wax.

DESCRIPTION OF THE PRIOR ART

Two kinds of similar wax from ethylene are known, but the processes for preparation of them are quite different from the process for preparation of high molecular weight plastic polyethylene. One of the processes comprises thermal cracking of high molecular weight plastic polyethylene prepared by both high and low pressure polymerization methods, and the other is the process comprising the polymerization reaction of ethylene employing normally liquid co-reactant from the group consisting of saturated C—H—O compounds and aralkane compounds having a boiling point below 200° C. in presence or absence of free radical forming catalyst at a pressure between 100 and 1,000 atmospheres and at a temperature within the range 100° C. to 300° C.

SUMMARY OF THE INVENTION

The new ethylene wax of the present invention is prepared by a similar method to the latter process, but the co-reactant is neither C—H—O compounds nor aralkane compounds. The co-reactant in the present invention is a chlorohydrocarbon compound having at most a molecular weight of 200 and two or more chlorine atoms on the different and adjoining carbon atoms of aliphatic hydrocarbons. Examples of the co-reactant of the present invention are 1.2-dichloroethane, 1.1.2-trichloroethane, 1.2-dichloropropane, 1.2.3 - trichloropropane, 1.2 - dichlorobutane, 2.3-dichlorobutane, etc. Such chlorohydrocarbons are easily obtained by addition of chlorine to the corresponding unsaturated compounds such as ethylene, vinyl-chloride, propylene, allylchloride, butene-1 and butene-2, etc. At least one of the chlorinated carbon atoms of the chlorohydrocarbons of the present invention has a hydrogen atom bonded thereto. In a more restricted version of the invention, at least two chlorinated carbon atoms of the chlorohydrocarbons each have a hydrogen atom bonded thereto.

DESCRIPTION OF THE PREFERRED EMBODIMENTS

Figure 1:
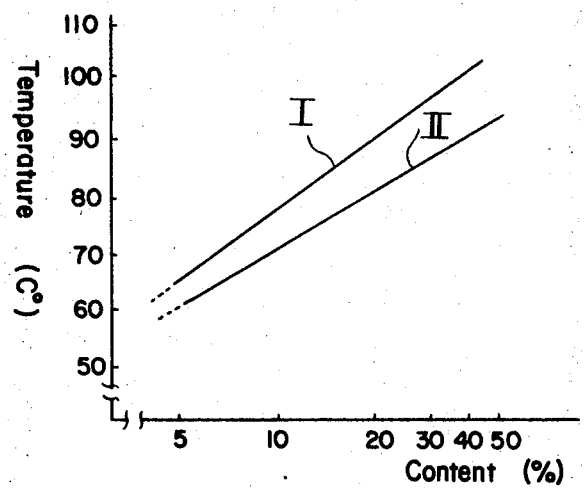
FIG. 1 is a graph of melting temperature versus wax content.

More particularly, in this invention, ethylene and co-reactant as defined above are heated in presence of a free radical forming catalyst in a pressure vessel. The temperature and the pressure in the pressure vessel are elevated gradually. The polymerization reaction starts when the temperature reaches the decomposing point of the catalyst. With rising temperature the reaction proceeds vigorously; then the pressure reaches a maximum point and descends gradually. The end point of the reaction is indicated by a stopping of the descending of the pressure. Reaction time is usually two or three hours. After reaching the end point of the reaction, the mixture is cooled to room temperature and unreacted ethylene gas is discharged and recovered. From the residue in the pressure vessel, unreacted co-reactant is removed by distillation under atmospheric or reduced pressure. A white granular wax is obtained as the residue. If the wax is discolored, it may be bleached completely by washing with warm methanol. The average molecular weight of the wax is affected by the molar ratio of ethylene to co-reactant in the initial reaction mixture and by the initial pressure of ethylene.

In the process of the invention, the free radical forming catalyst is a compound decomposing at a temperature in the range of 70–200° C. and is selected from peroxide compounds such as di-tert-butylperoxide, benzoylperoxide, lauroylperoxide, acetylperoxide, p.p′ - dimethylbenzoylperoxide, p.p′ - dimethoxylbenzoylperoxide, p.p′ - di-tert-butylbenzoylperoxide, and hydroperoxide compounds such as tert-butylhydroperoxide and cumene hydroperoxide, peracid compounds such as acetic peracid and benzoic peracid, azo compounds such as azo-bis-butyronitrile and diazoaminobenzene, and nitroso compounds such as N-nitroso - p - bromoacetanilide and N.N′-dinitroso-4.4′-dibromosuccinodianilide.

The reaction temperature is usually 75–250° C. and is mainly decided by the decomposing point of the catalyst. It is rather low, such as 75–120° C. when azo or nitrose compounds having lower decomposing points are employed but is rather high, such as 120–250° C., when peroxide or peracid compounds of higher decomposing point are employed.

Ethylene as the raw material should not contain oxygen, but alkane impurities such as methane, ethane and propane may be contained to 10% or less.

The pressure during the reaction may be in a range of about 80 to 500 kg./cm.$^2$.

The novel and improved wax from ethylene obtained by the aforesaid process has many superior properties.

A first of these is a higher melting point than that of known wax. For a given average molecular weight, this property extends the range of treating temperature in an industrial use and improves the heat resistance. In Table 1, it is shown that the novel waxes have higher melting points compared with the known waxes from ethylene and isopropanol.

TABLE 1

| Average molecular weight | Melting point (° C.) | |
|---|---|---|
| | Wax of the invention | Wax on the market |
| 2,000 | 114–116 | 104–108 |
| 5,000 | 116–118 | 107–111 |

NOTE.—1. Average molecular weight was measured by a cryoscopic method. 2. Melting point was measured by ball type softening point measuring apparatus.

A second of the wax's superior properties is its higher hardness which is important for its quality as a surface coating material and for protecting a surface coated therewith from injury by external forces such as shock, friction and compression. In Table 2, it is shown that the novel waxes have higher hardness than known isopropanol-ethylene waxes having the same average molecular weights.

TABLE 2

| Average molecular weight | Shore Hardness | |
|---|---|---|
| | Wax of the invention | Wax on the market |
| 2,000 | 78 | 65 |
| 5,000 | 79 | 70 |

NOTE.—Shore Hardness was measured by a Shore Durometer-D.

Figure 2:
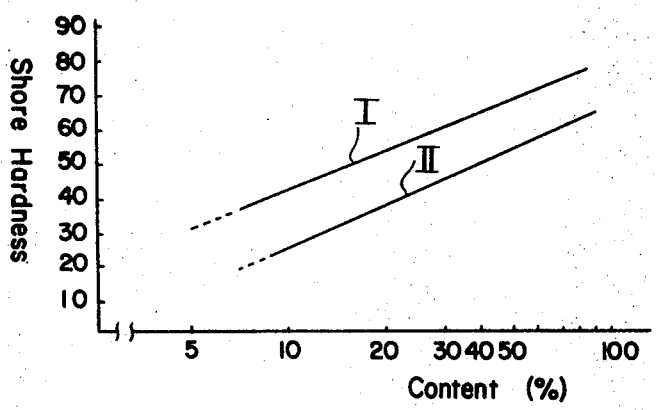
FIG. 2 is a graph of hardness versus wax content.

The third of the wax's superior properties is that it elevates the melting point and hardness of low melting paraffin wax when mixed therewith. Curves I in FIG. 1 and FIG. 2 show respectively the melting point and Shore hardness as functions of the ratio (expressed in percent) of the added amount of the novel wax having an average molecular weight of 2,000 to the total amount of the mixture of novel wax and paraffin wax. The paraffin wax used had a melting point of 55° C. and a Shore Hardness of 12. Curves II in the same figures show the course of melting point and Shore hardness in the case of addition, to the same paraffin wax, of the known wax from ethylene and isopropanol, this known wax having the same average molecular weight as the former novel wax, i.e. 2,000. In the both figures, Curve I is always above Curve II, showing that the elevating of melting point and hardness by addition of the novel wax is superior to that obtained by addition of the known wax.

Furthermore, the novel wax has other superior properties. Such are its water-proofing ability, its brightness and its electric insulating ability.

The above-described superior properties of the novel wax are presumed to be caused by the following facts:

(1) The reaction proceeds very easily by smooth abstraction of hydrogen atoms on carbon atoms attached to the chlorine atoms of the co-reactant molecule. Active here is the polar effect of chlorine atoms characterized in the literature of N. V. Sidgwick (The Covalent Link in Chemistry; Cornell University Press, 1933) by a partial electronic density $\delta$.

(2) The novel wax may have a densely steric configuration owing the structure of the co-reactant which has two or more chain-transferable points. And it is a fact that many chlorine atoms exist attached to tertiarycarbon atoms examples of the invention in the novel wax.

EXAMPLES OF THE INVENTION

The following examples will illustrate certain of many specific embodiments of the invention.

Example I

To a 3-l. stainless steel autoclave, 900 ml. of 1.2-dichloroethane (purity, 99.6%) and 12 g. of azo-bis-isobutyronitrile were added. After the air in the autoclave was replaced by ethylene, 460 l. of ethylene at normal state (Nl.) were introduced by compression in to the autoclave. The contents in the autoclave were heated at about 90° C. for one hour under agitation. While the reaction was proceeding, the temperature and the pressure elevated spontaneously to 94° C. and 84 kg./cm.$^2$ respectively. The pressure descended gradually to 29 kg./cm.$^2$ at last. The heating was stopped and after cooling the pressure was reduced to atmospheric pressure by discharge of the remaining gases which consisted mainly of unreacted ethylene. 378 g. of light yellowish white wax containing 5.15 percent (by weight) of chlorine component were obtained by stripping 1.2-dichloroethane from the residual mixture. The properties of the obtained wax are shown in Table III in comparison with another wax obtained from ethylene and isopropanol co-reactant by a similar procedure.

TABLE III

| Co-reactant | 1.2-dichloroethane | Isoproapnol |
|---|---|---|
| Average moecular weight | 780 | 800 |
| Melting point (° C.) | 98–99 | 95–98 |
| Specific gravity $d_{20}{}^{20}$ | 0.950 | 0.926 |
| Shore hardness | 55 | 40 |

NOTE.—Specific gravity $d_{20}{}^{20}$ measured by sink and float method.

Example II

To a 500 ml. stainless steel autoclave, 50 ml. of 1.2-dichloroethane and 1.2 g. of di-tert-butylperoxide were added. After replacement of air in the autoclave with ethylene, 152 Nl. of ethylene were introduced by compression in to the autoclave. The contents in the autoclave were heated at 125° C. and the reaction proceeded. The maximum temperature and pressure were 133° C. and 417 kg./cm.$^2$ respectively. Heating was continued until the pressure descended to 199 kg./cf.$^2$. After allowing the contents to cool, unreacted ethylene was discharged and recovered. 1.2-dichloroethane was removed from the residue by distillation to obtain 61.7 g. of white granular wax having an average molecular weight of 3,800, a melting point of 113–116° C., a specific gravity of 0.934 and a Shore Hardness of 75.

*Analysis.*—Found (percent): C, 84.3; H, 14.5; Cl, 1.38. The infra red absorption spectrum nearly agreed with that of high molecular weight plastic polyethylene except for the existence of absorption at a wave length of 13.2–13.3 caused by the C—Cl bond.

Example III

To a 500 ml. autoclave, 600 ml. of 1.2-dichloropropane and 13.8 g. of azo-bis-isobutyronitrile were added. After replacement of air with ethylene, 811 Nl. of ethylene were introduced into the autoclave. The mixture was heated to 73° C. and the reaction proceeded under gradually elevating temperature. The pressure in the autoclave attained to 288 kg./cm.$^2$ and then dropped to 180 kg./cm.$^2$, and the temperature elevated to 87° C. After the end of heating, the pressure was reduced by discharge of ethylene. 511 g. of white granular wax having the following properties were obtained by stripping 1.2-dichloropropane from the residual mixture. Average molecular weight 1,590; melting point 107–111° C.; specific gravity $$d_{20}^{20}\ 0.598$$

Shore Hardness 69; content of chlorine 3.32%.

We claim:
1. The process for the preparation of waxes which comprises heating ethylene with a chlorohydrocarbon selected from the group consisting of

1.2-di-chloroethane,
1.1.2-trichloroethane,
1.2-dichloropropane,
1.2.3-trichloropropane,
1.2-dichlorobutane, and
2.3-dichlorobutane as a co-reactant at a temperature in a range of 75 to 250° C. and at a pressure in a range of 80 to 500 kg./cm.$^2$ in a pressure vessel in the presence of a free radical forming catalyst at a temperature above the decomposing point of the catalyst, until a waxy polyethylene is produced.

2. The process according to claim 1, wherein the free radical forming catalyst is a compound decomposing at a temperature in a range of 70° C. to 200° C. and selected from the group consisting of peroxide, peracid, azo and nitroso compounds.

3. The process according to claim 1, wherein the co-reactant is 1.2-dichloroethane and the free radical forming catalyst is azo-bis-isobutyronitrile.

4. The process according to claim 1, wherein the co-reactant is 1.2-dichlorethane and the free radical forming catalyst is di-tert-butylperoxide.

5. The process according to claim 1, wherein the co-reactant is 1.2-dichloropropane and the free radical forming catalyst is azo-bis-isobutyronitrile.

6. A process according to claim 1, further comprising the step of removing air and its components from the ethylene and co-reactant before the step of heating.

References Cited
UNITED STATES PATENTS

| | | | |
|---|---|---|---|
| 2,402,137 | 6/1946 | Hanford et al. | 260—94.9 |
| 2,407,181 | 9/1946 | Scott | 260—94.9 |
| 2,683,141 | 7/1954 | Erchak, Jr. | 260—94.9 |
| 2,754,278 | 7/1956 | Wilson et al. | 260—94.9 |
| 2,999,856 | 9/1961 | Bestian et al. | 260—94.9 |
| 3,019,215 | 1/1962 | Kroeper et al. | 260—94.9 |
| 3,115,468 | 12/1963 | Emrick et al. | 260—94.9 |
| 3,127,387 | 3/1964 | Ham et al. | 260—94.9 |
| 3,129,212 | 4/1964 | Mortimer | 260—94.9 |
| 2,440,800 | 5/1948 | Hanford et al. | 260—658 |
| 2,811,514 | 10/1957 | Hagemeyer | 260—94.9 |

JOSEPH L. SCHOFER, Primary Examiner

E. J. SMITH, Assistant Examiner